(12) United States Patent
Song et al.

(10) Patent No.: US 7,835,290 B2
(45) Date of Patent: Nov. 16, 2010

(54) METHOD FOR MEASURING END-TO-END DELAY IN ASYNCHRONOUS PACKET TRANSFER NETWORK, AND ASYNCHRONOUS PACKET TRANSMITTER AND RECEIVER

(75) Inventors: Jong Tae Song, Daejeon (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 945 days.

(21) Appl. No.: 11/503,592

(22) Filed: Aug. 14, 2006

(65) Prior Publication Data

US 2007/0097865 A1    May 3, 2007

(30) Foreign Application Priority Data

Nov. 3, 2005    (KR) ...................... 10-2005-0104812

(51) Int. Cl.
G01R 31/08    (2006.01)
(52) U.S. Cl. .................................... 370/241.1
(58) Field of Classification Search ................. 370/235, 370/229, 236, 241.1, 2, 230, 241, 503, 237, 370/394, 389, 393, 392, 252, 509, 519, 236.2, 370/231, 254
See application file for complete search history.

(56) References Cited

U.S. PATENT DOCUMENTS

| | | | | |
|---|---|---|---|---|
| 5,337,307 A | * | 8/1994 | Sato et al. .................... | 370/397 |
| 5,450,394 A | * | 9/1995 | Gruber et al. ................ | 370/253 |
| 5,852,723 A | * | 12/1998 | Kalkunte et al. ............. | 709/235 |
| 5,926,459 A | * | 7/1999 | Lyles et al. .................. | 370/230 |
| 6,215,791 B1 | * | 4/2001 | Kim ............................ | 370/412 |
| 6,331,982 B1 | * | 12/2001 | Watanabe .................... | 370/399 |
| 6,381,214 B1 | * | 4/2002 | Prasad ...................... | 370/230.1 |
| 6,912,216 B1 | | 6/2005 | Smith et al. | |
| 2001/0038607 A1 | * | 11/2001 | Honda ......................... | 370/218 |
| 2002/0172148 A1 | * | 11/2002 | Kim et al. .................... | 370/216 |
| 2003/0103522 A1 | * | 6/2003 | Hane ........................... | 370/462 |

FOREIGN PATENT DOCUMENTS

| | | |
|---|---|---|
| KR | 10-0317707 | 7/2000 |
| KR | 10-0337143 | 10/2000 |
| KR | 10-0317125 | 7/2001 |
| KR | 10-0342434 | 4/2002 |
| KR | 10-2005-0032805 | 4/2005 |

* cited by examiner

*Primary Examiner*—Kwang B. Yao
*Assistant Examiner*—Anh Ngoc Nguyen
(74) *Attorney, Agent, or Firm*—Ladas & Parry LLP

(57) ABSTRACT

Provided are a method for measuring an end-to-end delay, and asynchronous packet transmitter/receiver, capable of conveniently and exactly measuring a packet delay in an asynchronous packet transfer network in which a transfer priority is determined as in MPLS. The method includes the steps of continuously transmitting a higher priority packet and a lower priority packet at an ingress node, measuring a time when the higher priority packet arrives at an egress node, measuring a time when the lower priority packet arrives at the egress node, and calculating a delay time from the arrival time of the higher and lower priority packets. The higher and lower priority packets each include Coupled Label and Sequence Number fields for discriminating one of the packets that are repeatedly transmitted, the Coupled Label field of the higher priority packet is recorded with a label value of the lower priority packet, and the Coupled Label field of the lower priority packet is recorded with a label value of the higher priority packet.

10 Claims, 3 Drawing Sheets

METHOD FOR MEASURING END-TO-END DELAY IN ASYNCHRONOUS PACKET TRANSFER NETWORK, AND ASYNCHRONOUS PACKET TRANSMITTER AND RECEIVER

CROSS-REFERENCE TO RELATED APPLICATION

This application claims priority to and the benefit of Korean Patent Application No. 2005-104812, filed Nov. 3, 2005, the disclosure of which is incorporated herein by reference in its entirety.

BACKGROUND

1. Field of the Invention

The present invention relates to a method for effectively measuring a packet delay in an asynchronous packet transfer network. More particularly, the present invention relates to a method for measuring an end-to-end delay, and asynchronous packet transmitter and receiver, capable of conveniently and exactly measuring a packet delay in an asynchronous packet transfer network in which a transfer priority is determined as in MPLS (Multi-Protocol Label Switching).

2. Discussion of Related Art

With tremendous distribution of Internet services, many users have a demand for a network structure that guarantees quality of service (QoS) and safety, as well as an end-to-end connection. This QoS-guaranteed service implementation cannot be provided by an existing Internet structure. In order to support this, various schemes are actively worked out in international and national standardization groups. Particularly, Focus Group for Next Generation Network (FGNGN) of the ITU Telecommunication Standardization Sector (ITU-T) defines an Internet-based circuit oriented packet switching structure of NGN. A fundamental premise of the newly defined network structure is to guarantee QoS for the services coming into the network. To the end, a session- or flow-based admission control function is essential. In other words, before one session is initiated, it should be determined whether to meet the QoS required by the session, and determined whether to admit the session.

The QoS in the packet switching mode is estimated based on basic measurement values of packet traffic: loss, delay, and delay variation of the packet. Thus, measurement and monitoring of these values become important in checking whether the QoS is successfully guaranteed. The present invention proposes a method for effectively measuring the delay value of a packet in equipment.

The delay measuring method is being actively studied, and its standardizing work is in progress mainly at MEF (Metro Ethernet Forum) or ITU-T as well. A delay measuring scheme that is used currently is designed to allocate and transfer the value of a time stamp to a transmission packet in the network where all network facilities are synchronized to the same time, because all network facilities are synchronized like SONET (Synchronous Optical NETwork) or SDH (Synchronous Digital Hierarchy). For example, a method is used which measures the delay of a packet or calculates a round-trip delay between two facilities when not synchronized, to infer that the measured or calculated half value is a one-way delay.

However, the conventional delay measuring method has the following problems. In the case where the time stamp is used, it is premised on the synchronization of the network. Hence, it is difficult to apply to an asynchronous network such as Ethernet. An NPT (Network Timing Protocol) may apply which is proposed to synchronize between network facilities in an IP layer. The NTP provides accuracy in a microsecond in the case of synchronization in a narrow area network such as LAN (Local Area Network), but provides only accuracy in a millisecond in a wide area network such as WAN (Wide Area Network). For this reason, the NPT cannot extend to time synchronization of a large-scaled transport network. Further, when the NPT extends to the large-scaled network, a system load for NPT processing between the facilities is increased, so that the facilities can be deteriorated in performance.

When the delay value is inferred using the round-trip delay value, a time, which it takes to transmit a measurement packet from a source node to a destination node and then to receive its response, is measured, and thereby a delay between the source node and the destination node is measured. In this case, the delay value is inferred by taking the half of the round-trip delay value on the assumption that the traffic is equally distributed in both directions. As such, the delay value cannot be exactly measured in an actual network circumstance where the bi-directional traffic distributions are not equal.

Meanwhile, in order to solve a problem, namely a QoS issue, of the traditional packet switching scheme, the circuit oriented packet switching scheme is used. Thereby, it is possible for network operators to control a path of the traffic. The packets are switched at all nodes based on a destination address of the packet in the existing packet network. However, in the circuit-based case, there is provided a traffic engineering function capable of choosing a different path according to a destination node as well as a source node or service type. In other words, the circuit oriented technique operates the network in such a manner that a different path is used for packets having the same destination depending on the source node or traffic characteristics. This can maximize efficiency of the network.

The most typical circuit oriented packet switching scheme is MPLS. The MPLS is adapted to transmit multiple types of packets through a single path. The MPLS can also provide differentiated service with respect to multiple classes of traffic. Typical class-specific traffic engineering using the MPLS can be generally classified into two: L-LSP (Label-Only-Inferred-PSC Label Switched Path) and E-LSP (EXP-Inferred-PSC Label Switched Path). The two schemes control a priority or class of traffic in a different fashion. In the case of the L-LSP, all traffics delivered through one label are provided with a same class of service. In the case of the E-LSP, traffics delivered through the same label are provided with a different class of service. In other words, in the L-LSP, the traffic class is indicated in a label value, whereas in the E-LSP, the traffic class is indicated in an Exp field rather than the label value of an MPLS header.

The packets delivered through the pre-defined MPLS path monitor and manage safety of the transfer path through OAM (Operation, Adminmstration and Maintenance) functions which are mainly provided on the basis of the path. One of important functions of the OAM is to measure performance of the transfer path. Among performance of the transfer path, delay information is important one of informing the state of a network. A lot of efforts have been made to measure the delay information of a packet in a virtual circuit-based MPLS network, but most of the efforts have been made by the time stamp. In this case, support in the asynchronous network is difficult due to network synchronization. Another way is to use a delay time. However, since the MPLS is for uni-directional transmission and does not have the same delay in both directions, the use of the delay time is not appropriate. Thus, there is a strong need for an efficient delay measuring method for measuring a uni-directional delay of a virtual circuit like the MPLS while being available in a gradually increasing asynchronous network such as Ethernet.

SUMMARY OF THE INVENTION

The present invention is directed to conveniently and easily measuring a delay value in an asynchronous packet transfer network.

The present invention is also directed to relatively exactly measuring a uni-directional delay value from a source node to a destination node in an asynchronous packet transfer network.

According to an aspect of the present invention, there is provided a method for measuring an end-to-end delay in an asynchronous packet transfer network in which class-based traffic is supported. The method includes the steps of: continuously transmitting a higher priority packet and a lower priority packet at an ingress node; measuring a time when the higher priority packet arrives at an egress node; measuring a time when the lower priority packet arrives at the egress node; and calculating a delay time from the time when the higher and lower priority packets arrive According to another aspect of the present invention, there is provided an asynchronous packet transmitter including: a data packet controller for generating a data packet containing data to be transmitted; an Operation, Administration and Maintenance (OAM) packet generator for generating an OAM packet consisting of a higher priority packet and a lower priority packet which are identified as a pair; and a packet output unit for outputting the data packets and outputting the lower priority packet immediately after outputting the higher priority packet.

According to yet another aspect of the present invention, there is provided an asynchronous packet receiver including: a receiving terminal for receiving packets that are input through a transfer channel; an Operation, Administration and Maintenance (OAM) detector for discriminating between a higher priority packet and a lower priority packet constituting an OAM packet among the received packets; and an OAM processing module for estimating an end-to-end delay of a transfer path from the discriminated OAM packet.

Here, the higher and lower priority packets may each include a Coupled Label field, and a Sequence Number field for discriminating one of the packets that are repeatedly transmitted. The Coupled Label field of the higher priority packet may be recorded with a label value of the lower priority packet. The Coupled Label field of the lower priority packet may be recorded with a label value of the higher priority packet.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Figure 1:
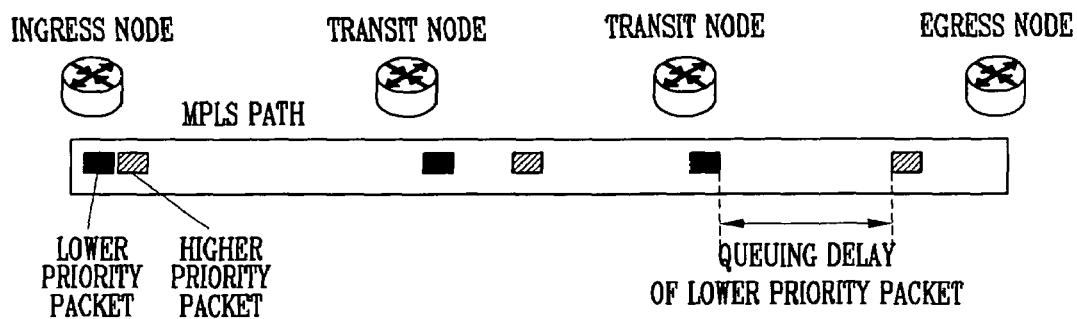
FIG. 1 is a schematic data transfer diagram explaining a key idea of the present invention.

Hereinafter, an exemplary embodiment of the present invention will be described in detail. However, the present invention is not limited to the embodiments disclosed below, but can be implemented in various types. Therefore, the present embodiment is provided for complete disclosure of the present invention and to fully inform the scope of the present invention to those ordinarily skilled in the art.

The end-to-end delay of a packet on a virtual circuit is generally divided into three types: a packet processing delay, a propagation delay, and a queuing delay caused by the buffering of a transfer node.

The packet processing delay is a delay of parsing and processing information in the header of a packet that is received from each node, and the propagation delay is a delay that constantly increases as a distance between an ingress node and an egress node is increased. Both the packet processing delay and the propagation delay account for a fixed percentage of the end-to-end delay, whose value is constantly kept at any time. Since the propagation delay varies in proportion to a distance between network facilities, the value is the same for all the transferred packets. In the case of the packet processing delay, since many packet processing functions are implemented by hardware, all packets undergo substantially the same amount of packet processing delay.

On the other hand, the queuing delay is dynamically varied according to a state of the network. When the network state is good, the queuing delay between the network facilities is next to nothing. In contrast, when the network is in a congested state, a value of the queuing delay is greatly increased. Thus, measurement of the queuing delay value makes it possible to obtain the end-to-end delay by adding the packet processing delay having a relatively fixed value to the propagation delay.

The queuing delay value of each node is dependent on a PHB (Per Hop Behavior) and traffic volume of each node. When the traffic volume directing to one output port is little, a queuing delay time of all packets directing corresponding ports is short. As the traffic volume increases, the queuing delay time of the packet increases. As the queuing delay time caused by buffering increases, class-based scheduling of the node is performed, and a lower class of packet has a relatively frequent queuing delay.

In the case of a network of supporting class-based traffic, the node performs scheduling according to a priority. Most network operators thoroughly control a higher class of traffic, thereby transmitting the packet nearly without the queuing delay. Therefore, in the case of a high class of packet, a large portion of the end-to-end delay value is caused by the packet processing delay or propagation delay. The delay measurement provided by the present invention is performed by comparing a low class of delay information with a higher class of delay value using a characteristic that the high class of packet has a constant delay value.

FIG. 1 illustrates an overview of the present invention. There is shown one of MPLS paths in an MPLS-based network. The shown MPLS path is a DiffServ-Aware MPLS path, i.e. E-LSP, which is one example of a class-based transfer path supporting multiple classes of packets on the same path. Nodes on one MPLS path are classified into an ingress node (IN), a transit node (TN), and an egress node (EN). The ingress node (IN) transmits a high class of delay measurement packet and a low class of delay measurement packet on the same path at the same time. As shown, the packet having a low level of processing priority (i.e., lower priority packet) is transmitted following the packet having a high level of processing priority (i.e., higher priority packet). The two packets that are transmitted in a pair at the same time are increased in distance therebetween while passing through the TNs. This is because each node differentially processes the higher priority packet and the lower priority packet. As a result, the two packets are received by the egress node (EN) at a different time. The EN calculates a low class of delay using the time difference between the two received packets. Many network operators make use of the high class of traffic (higher priority packet) to exchange information for network control or provide a high quality of service that requires differentiated service. In this case, a volume of traffic is thoroughly managed so that the queuing delay is not generated in the network. Thus, a high class of end-to-end delay may be packet processing delay and propagation delay. The reception time difference between the two delay measurement packets at the EN may be a value of the queuing delay that the lower priority packet undergoes on the path. Therefore, the end-to-end delay value of the lower priority packet can be calculated by adding the value of the low class of queuing delay to a certain quantity of propagation delay and packet processing delay.

Figure 2:
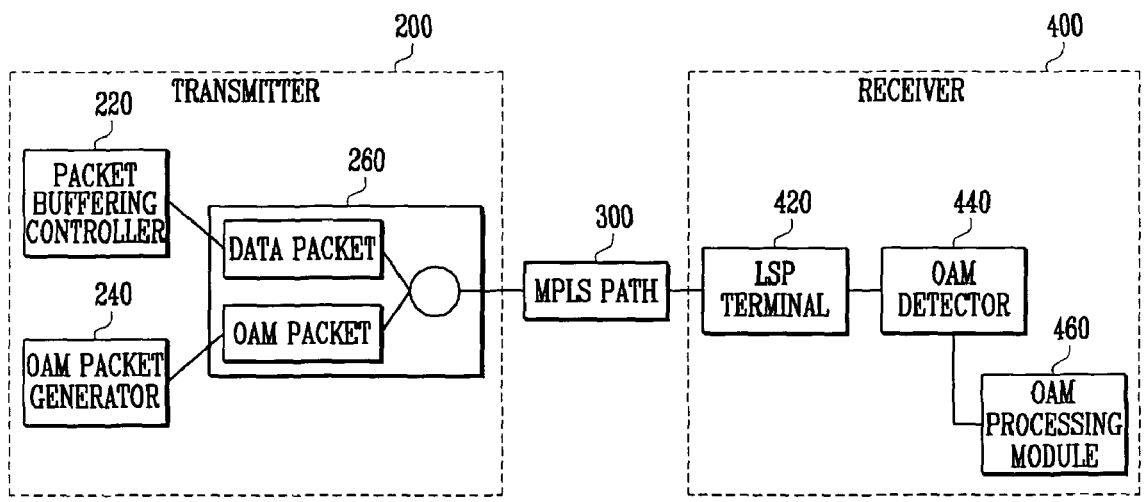
FIG. 2 is a block diagram showing components of ingress and egress nodes for implementing the present invention.

FIG. 2 shows structures of an ingress node (IN) and an egress node (EN) for implementing the present invention. An asynchronous packet transmitter 200, an apparatus for the IN, includes a data packet controller 220 for generating a data packet containing data to be transmitted, an OAM packet generator (OPG) 240 for generating an OAM packet consisting of a higher priority packet and a lower priority packet which are identified as a pair, and a packet output unit 260 for outputting the data packets and outputting the lower priority packet immediately after outputting the higher priority packet. An asynchronous packet receiver 400, an apparatus for the EN, includes a receiving terminal 420 for receiving packets input through a transfer channel 300, an OAM detector 440 for discriminating between the higher priority packet and the lower priority packet, which constitute the OAM packet among the received packets, and an OAM processing module 460 for estimating an end-to-end delay of the transfer path from the identified OAM packet.

The OPG 240 of the IN periodically generates the higher and lower priority OAM packets for delay measurement, and then continuously transmits the generated OAM packets. It does not matter which one of the OAM packets is transmitted first. However, the higher priority packet that arrives first is preferably transmitted first, because an arrival sequence is not changed, and thus packet processing gets easier at the EN. The two packets that are continuously transmitted are subjected to scheduling while passing through the TNs. According to the scheduling, the lower priority packet is gradually delayed. Accordingly, such a delay difference becomes greater at the final node. At the EN where the MPLS path is terminated, when it is confirmed that the transmitted packet is the OAM packet for the delay measurement, the transmitted packet is transmitted to the OAM processing module, and then the delay measurement is performed.

Figure 3:
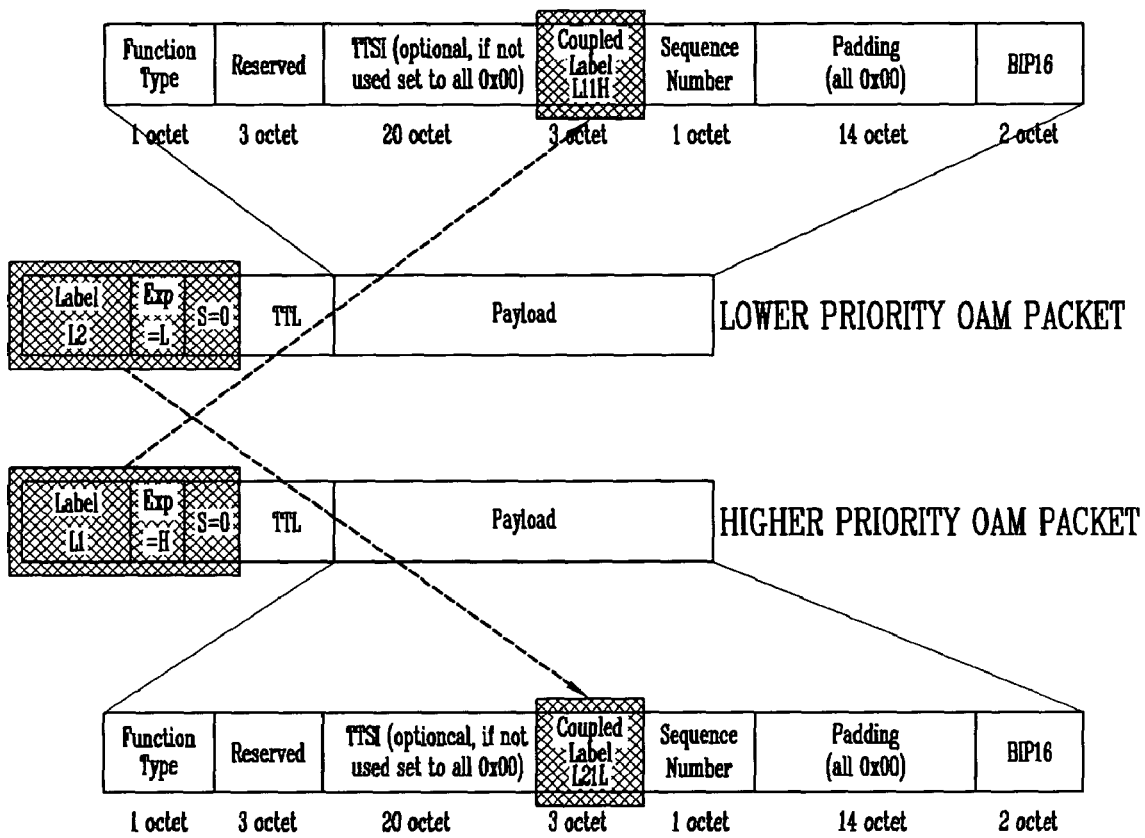
FIG. 3 shows the format of a delay measurement OAM packet for performing functions of the present invention.

FIG. 3 shows the format of a delay measurement OAM packet. A basic frame structure makes use of an OAM format defined by ITU-T. Here, most fields excluding Coupled Label and Sequence Number fields have the same value as a format defined in an existing OAM packet. Like the existing OAM packet, both the higher and lower priority packets have the value of a label, identifying symbol, for discrimination from the other transmitted packets. A coupled label field added in the present embodiment is recorded with a value of the label that is compared with one of a corresponding packet that is transmitted. In other words, the coupled label field of the higher priority packet is recorded with the label value of the lower priority packet that is transmitted from the IE at the same time, whereas the coupled label field of the lower priority packet is recorded with the label value of the higher priority packet that is transmitted at the same time. In other words, the coupled label field is recorded with the label value of one of the higher and lower priority packets that makes a pair.

In a real network operating environment, in order to prepare for a potential loss while the OAM packet according to the present invention is transmitted, the packet pair consisting of the higher priority packet and the lower priority packet is repeatedly transmitted several times at predetermined intervals. At this time, since the delay of the transfer line is very great, the numerous higher priority packets having the same label value may be received first, and then the lower priority packets may be received. In order to discriminate the packet pair exactly, the packet is provided with a Sequence Number field. In other words, the Sequence Number fields of the pair of higher and lower priority packets that are repeatedly transmitted are generally recorded with a value corresponding to the repeated number of times repeated transfer number of times.

The method for measuring the end-to-end delay in the asynchronous packet transfer network supporting the class-based traffic in accordance with the present invention includes a step of continuously transmitting a higher priority packet and a lower priority packet at an IN, a step S140 of measuring a time when the higher priority packet arrives at an EN, a step S160 of measuring a time when the lower priority packet arrives at the EN, and a step S180 of calculating a delay time from the time that the highest and lowest priority packets arrive.

Figure 4:
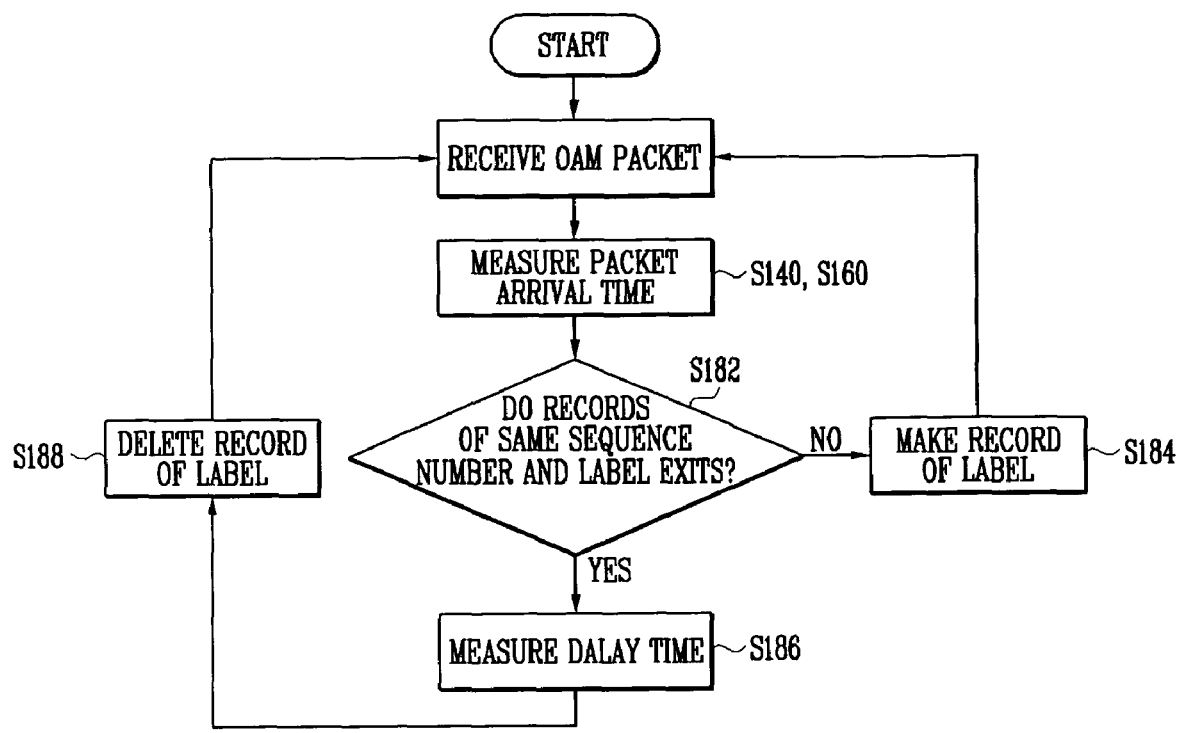
FIG. 4 is a flowchart showing an algorithm preformed by an egress node in a method for measuring an end-to-end delay in accordance with the present invention.

The method for measuring the end-to-end delay is performed on the basis of the idea as described above with reference to FIG. 1. FIG. 4 shows processes performed at the EN, in the method for measuring the end-to-end delay using the OAM packet in accordance with the present invention. When receiving the delay measurement OAM packet, the EN measures a time at which the packet is received (S140 and S160). The delay time calculating step S180 includes a step S182 of, after a coupled label value and a sequence number are read out of the received OAM packet whose reception time is measured, checking whether or not there exist records of an existing coupled label and an existing sequence number, a step S184 of, when the record of the coupled label does not exist, storing the record of the current OAM packet and then waiting for the next OAM packet, a step S186 of, when the record of the coupled label exists, calculating a delay difference using a time of receiving the current OAM packet and a time of receiving the existing coupled label, and a step S188 of deleting the record of the label used and the record having the previous sequence number.

In above description, the asynchronous packet transfer network includes at least one of Ethernet, MPLS and IP packet switching network, but isn't limited that.

The delay of the packet is measured at the EN using the delay time without synchronizing the network for the end-to-end delay measurement at the current network, so that it is possible to detect performance of the network in a more exact and speedy way, and to expand performance measurement of the network that makes use of the virtual circuit which is implemented in focus on the MPLS up to a large-scaled network.

Further, in measuring a uni-directional delay value from the source node to the destination node in the asynchronous network, it is unnecessary to synchronize the network facilities as well as to calculate the uni-directional delay value from the round-trip delay, so that the measurement become simpler and easier.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for measuring an end-to-end delay in an asynchronous packet transfer network that supports class-based traffic, the method comprising the steps of:
    a) transmitting, by a packet transmitter, a higher priority packet and a lower priority packet at an ingress node;
    b) measuring, by a packet receiver, a time when the higher priority packet arrives at an egress node;
    c) measuring, by a packet receiver, a time when the lower priority packet arrives at the egress node; and
    d) calculating, based on the measurements in b and c, a delay time for measuring the end-to-end delay, the delay time being a time difference between the time when the higher priority packet arrives at the egress node and the time when the lower priority packet arrives at the egress node,
    wherein: the higher and lower priority packets each include a Coupled Label field, and a Sequence Number field for discriminating one of the packets that are repeatedly transmitted; the Coupled Label field of the higher priority packet is recorded with a label value of the lower priority packet; and the Coupled Label field of the lower priority packet is recorded with a label value of the higher priority packet.

2. The method according to claim 1, wherein step d) includes the steps of checking the recorded values of the Coupled Label and Sequence Number fields of the higher and lower priority packets that have arrived, and determining an exact pair of the higher and lower priority packets.

3. The method according to claim 1, wherein the higher and lower priority packets have a format where the Coupled Label and Sequence Number fields are added to a format of the standard Multi-Protocol Label Switching (MPLS) packet.

4. The method according to claim 2, wherein the higher and lower priority packets have a format where the Coupled Label and Sequence Number fields are added to a format of the standard Multi-Protocol Label Switching (MPLS) packet.

5. The method according to claim 1, wherein the asynchronous packet transfer network includes at least one of Ethernet, MPLS and IP packet switching network.

6. An asynchronous packet transmitter comprising:
    a data packet controller for generating a data packet containing data to be transmitted;
    an Operation, Administration and Maintenance (OAM) packet generator for generating an OAM packet comprising a higher priority packet and a lower priority packet which are identified as a pair, wherein
        the higher and lower priority packets each include a Coupled Label field, and a Sequence Number field for discriminating one of the packets that are repeatedly transmitted;
        the Coupled Label field of the higher priority packet is recorded with a label value of the lower priority packet; and
        the Coupled Label field of the lower priority packet is recorded with a label value of the higher priority packet; and
    a packet output unit for outputting the data packets and outputting the lower priority packet of the pair after outputting the higher priority packet of the pair.

7. An asynchronous packet receiver comprising: a receiving terminal for receiving packets that are input through a transfer channel;
    an Operation, Administration and Maintenance (OAM) detector for discriminating between a higher priority packet and a lower priority packet constituting an OAM packet among the received packets; and
    an OAM processing module for estimating an end-to-end delay of a transfer path from the discriminated OAM packet by calculating a time difference between when the higher priority packet arrives and the lower priority packet arrives,
    wherein: the higher and lower priority packets each include a Coupled Label field, and a Sequence Number field for discriminating one of the packets that are repeatedly transmitted; the Coupled Label field of the higher priority packet is recorded with a label value of the lower priority packet; and the Coupled Label field of the lower priority packet is recorded with a label value of the higher priority packet.

8. The asynchronous packet receiver according to claim 7, wherein the OAM processing module performs a method for measuring an end-to-end delay, the method including the steps of: measuring a time when the higher priority packet arrives; measuring a time when the lower priority packet arrives; checking the recorded values of the Coupled Label and Sequence Number fields of the higher and lower priority packets that have arrived, and determining an exact pair of the higher and lower priority packets; and calculating a delay time from a difference between the time when the paired higher and lower priority packets arrive.

9. The method according to claim 1, wherein the higher and lower priority packets are identified as a pair, and each of the higher and lower priority packets identified as a pair comprises a value for identifying the other of the higher and lower packets at the egress node.

10. The asynchronous packet receiver of claim 7, wherein the higher and lower priority packets are identified as a pair, and each of the higher and lower priority packets identified as a pair comprises a value for identifying the other of the higher and lower packets.

* * * * *